(12) United States Patent
Dijkstra et al.

(10) Patent No.: US 11,772,883 B2
(45) Date of Patent: Oct. 3, 2023

(54) CAPSULE, A SYSTEM FOR PREPARING A POTABLE BEVERAGE FROM SUCH A CAPSULE AND USE OF SUCH A CAPSULE IN A BEVERAGE PREPARATION DEVICE

(71) Applicant: Koninklijke Douwe Egberts B.V., Utrecht (NL)

(72) Inventors: Hielke Dijkstra, Utrecht (NL); Arend Hendrik Groothornte, Utrecht (NL); Erik Pieter van Gaasbeek, Utrecht (NL); Marc Henrikus Joseph Ottenschot, Utrecht (NL); Ralf Kamerbeek, Utrecht (NL); Armin Sjoerd Eijsackers, Utrecht (NL); John Henri Flamand, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 147 days.

(21) Appl. No.: 15/813,049

(22) Filed: Nov. 14, 2017

(65) Prior Publication Data
US 2018/0297776 A1   Oct. 18, 2018

Related U.S. Application Data

(63) Continuation of application No. PCT/NL2016/050346, filed on May 13, 2016.

(51) Int. Cl.
*A47J 31/36* (2006.01)
*B65D 85/804* (2006.01)
*A47J 31/40* (2006.01)

(52) U.S. Cl.
CPC .......... *B65D 85/8064* (2020.05); *A47J 31/36* (2013.01); *A47J 31/407* (2013.01)

(58) Field of Classification Search
CPC ................ A47J 31/0615; A47J 31/0621; A47J 31/0631; A47J 31/0636; A47J 31/0642;
(Continued)

(56) References Cited

U.S. PATENT DOCUMENTS 4,319,758 A * 3/1982 Nicholson ............ F16J 15/3204
277/550
4,526,385 A * 7/1985 Wheeler .............. F16J 15/3208
277/910
(Continued)

FOREIGN PATENT DOCUMENTS

AU    2015255218 A1    11/2015
AU    2016253679 A1    11/2016
(Continued)

OTHER PUBLICATIONS

International Search Report and Written Opinion, PCT/NL2016/050346, Koninklijke Douwe Egberts B.V., 12 pages (dated Nov. 10, 2016).
(Continued)

*Primary Examiner* — Phuong T Nguyen
(74) *Attorney, Agent, or Firm* — Fitch, Even, Tabin & Flannery LLP

(57) ABSTRACT

A capsule containing a substance for the preparation of a potable beverage. The capsule comprises an aluminum capsule body having a side wall and an outwardly extending flange and a sealing member at the outwardly extending flange for providing a fluid sealing contact with an enclosing member of a beverage preparation device. The beverage preparation device comprises an annular element having a free contact end which is provided with a plurality of radially extending open grooves. The sealing member comprises a separate crushable element provided on the surface of the outwardly extending flange opposite the cover.

37 Claims, 6 Drawing Sheets

(58) Field of Classification Search
CPC ............... A47J 31/0673; A47J 31/0678; A47J 31/3638; A47J 31/3642; A47J 31/3695; A47J 31/405; A47J 31/407; A47J 31/4492; A47J 31/467
USPC ......... 99/280, 281, 282, 283, 284, 287, 292, 99/295, 297, 303, 306, 308, 322
See application file for complete search history.

(56) References Cited

U.S. PATENT DOCUMENTS

| | | | |
|---|---|---|---|
| 4,651,538 A * | 3/1987 | Bull | B67D 1/0857 222/146.6 |
| 4,784,397 A * | 11/1988 | Tozer | F16J 15/0887 277/644 |
| 4,798,392 A * | 1/1989 | Tozer | F16J 15/0887 277/644 |
| 4,915,397 A * | 4/1990 | Nicholson | F16J 15/0887 277/645 |
| 5,161,806 A * | 11/1992 | Balsells | F16J 15/027 277/467 |
| 5,240,263 A * | 8/1993 | Nicholson | F16J 15/0893 219/137 R |
| 5,354,072 A * | 10/1994 | Nicholson | F16J 15/0887 277/647 |
| 5,554,395 A * | 9/1996 | Hume | B29C 45/27 425/549 |
| 5,798,599 A | 8/1998 | Harwood | |
| 5,897,899 A | 4/1999 | Fond | |
| 6,550,157 B1 | 4/2003 | Harding | |
| 6,854,378 B2 | 2/2005 | Jarisch | |
| 7,758,367 B2 * | 7/2010 | Siebens | H01R 13/631 439/271 |
| 8,176,714 B2 | 5/2012 | Abegglen | |
| 8,613,246 B2 | 12/2013 | Ryser | |
| 2001/0048178 A1 * | 12/2001 | Jud | B32B 27/00 264/171.13 |
| 2005/0061705 A1 * | 3/2005 | Spallek | B32B 15/08 206/528 |
| 2005/0067127 A1 * | 3/2005 | Frisk | B32B 1/02 162/135 |
| 2005/0084695 A1 * | 4/2005 | Shirane | B32B 7/12 428/483 |
| 2005/0155991 A1 | 7/2005 | Jackman | |
| 2006/0110507 A1 * | 5/2006 | Yoakim | B65D 85/8043 426/433 |
| 2007/0202237 A1 * | 8/2007 | Yoakim | B65D 85/8043 426/590 |
| 2008/0044603 A1 | 2/2008 | Hutchinson | |
| 2009/0017177 A1 | 1/2009 | Yoakim et al. | |
| 2009/0223373 A1 | 9/2009 | Kollep | |
| 2009/0280219 A1 | 11/2009 | Yoakim | |
| 2009/0320692 A1 | 12/2009 | Simanski | |
| 2010/0015307 A1 | 1/2010 | Abegglen et al. | |
| 2010/0178404 A1 | 7/2010 | Yoakim | |
| 2010/0183777 A1 | 7/2010 | Sagy | |
| 2011/0000917 A1 * | 1/2011 | Wolters | B65D 77/2024 220/376 |
| 2011/0020500 A1 | 1/2011 | Eichler | |
| 2011/0027547 A1 | 2/2011 | Xun | |
| 2011/0041702 A1 | 2/2011 | Yoakim | |
| 2011/0185910 A1 | 8/2011 | Ryser | |
| 2011/0185911 A1 | 8/2011 | Rapparini | |
| 2011/0200725 A1 | 8/2011 | Kollep | |
| 2011/0259204 A1 * | 10/2011 | Kaeser | F16J 15/108 99/295 |
| 2011/0315021 A1 * | 12/2011 | Eichler | B65D 85/8046 99/295 |
| 2012/0031794 A1 | 2/2012 | Ozanne | |
| 2012/0225168 A1 | 9/2012 | Kamerbeek | |
| 2012/0231123 A1 | 9/2012 | Kamerbeek | |
| 2012/0244384 A1 | 9/2012 | Burt | |
| 2012/0251694 A1 | 10/2012 | Kamerbeek | |
| 2012/0272830 A1 | 11/2012 | Gugerli | |
| 2013/0099597 A1 | 4/2013 | Perentes et al. | |
| 2013/0180408 A1 | 7/2013 | Eichler et al. | |
| 2013/0224341 A1 | 8/2013 | Bendavid | |
| 2013/0259982 A1 | 10/2013 | Abegglen | |
| 2013/0340478 A1 | 12/2013 | Miyoshi | |
| 2014/0170271 A1 | 6/2014 | Zweed et al. | |
| 2014/0178537 A1 | 6/2014 | Zweed et al. | |
| 2014/0328983 A1 * | 11/2014 | Jarisch | A47J 31/4492 426/232 |
| 2015/0033947 A1 * | 2/2015 | Van Der Kamp | A47J 31/0621 99/283 |
| 2015/0151903 A1 * | 6/2015 | Bartoli | B65D 85/8064 206/0.5 |
| 2015/0223632 A1 * | 8/2015 | Hall | A47J 31/44 99/295 |
| 2016/0037961 A1 | 2/2016 | Digiuni | |
| 2016/0075506 A1 | 3/2016 | Chapman | |
| 2016/0159563 A1 | 6/2016 | Bartoli | |
| 2016/0353918 A1 * | 12/2016 | Talon | A47J 31/407 |
| 2016/0362246 A1 * | 12/2016 | Garcin | A47J 31/407 |
| 2016/0362247 A1 | 12/2016 | Bartoli | |
| 2017/0158422 A1 * | 6/2017 | Andreae | B65D 65/466 |
| 2017/0325619 A1 | 11/2017 | Holten | |
| 2018/0105355 A1 | 4/2018 | Harif | |
| 2018/0257856 A1 | 9/2018 | Oliver | |
| 2018/0273286 A1 | 9/2018 | Dijkstra | |
| 2018/0289201 A1 | 10/2018 | Dijkstra | |
| 2018/0290824 A1 | 10/2018 | Dijkstra | |
| 2018/0290825 A1 | 10/2018 | Dijkstra | |
| 2018/0297775 A1 | 10/2018 | Dijkstra | |
| 2018/0297776 A1 | 10/2018 | Dijkstra | |
| 2019/0077588 A1 | 3/2019 | Bartel | |
| 2019/0177078 A1 | 6/2019 | Dijkstra | |
| 2020/0047986 A1 | 2/2020 | Kamerbeek | |
| 2020/0047987 A1 | 2/2020 | Kamerbeek | |

FOREIGN PATENT DOCUMENTS

| | | |
|---|---|---|
| AU | 2017219060 A1 | 9/2017 |
| CA | 2901582 A1 | 11/2014 |
| CN | 105188488 | 12/2015 |
| DE | 10 2008 014 758 A1 | 10/2009 |
| DE | 20 2009 009 125 U1 | 10/2010 |
| DE | 10 2010 027 484 A1 | 1/2012 |
| DE | 10 2010 034 260 A1 | 2/2012 |
| DE | 10 2010 047 890 A1 | 2/2012 |
| DE | 20 2013 005 950 U1 | 11/2013 |
| DE | 20 2015 004 716 U1 | 11/2015 |
| DE | 202016106171 U1 | 11/2016 |
| EP | 0 468 079 | 1/1992 |
| EP | 0 844 195 B1 | 5/1998 |
| EP | 1 165 398 B1 | 12/2002 |
| EP | 1 190 959 B1 | 3/2004 |
| EP | 1 654 966 B1 | 5/2006 |
| EP | 1 700 548 | 9/2006 |
| EP | 1 700 584 A1 | 9/2006 |
| EP | 1700548 B1 | 9/2006 |
| EP | 1 299 022 B1 | 2/2007 |
| EP | 1 339 305 B1 | 4/2007 |
| EP | 1 646 305 B1 | 9/2007 |
| EP | 1 849 715 B1 | 10/2007 |
| EP | 1 882 431 B1 | 1/2008 |
| EP | 1 892 199 A1 | 2/2008 |
| EP | 1 839 543 B1 | 6/2008 |
| EP | 1 859 712 B1 | 1/2009 |
| EP | 1 859 714 B1 | 2/2009 |
| EP | 2 070 828 B1 | 6/2009 |
| EP | 1 816 934 B1 | 11/2009 |
| EP | 1 967 099 B1 | 1/2010 |
| EP | 1 900 653 B1 | 3/2010 |
| EP | 2 029 457 B1 | 3/2010 |
| EP | 1 882 432 B1 | 7/2010 |
| EP | 2 230 195 A1 | 9/2010 |
| EP | 2 142 054 B1 | 1/2011 |
| EP | 2 068 684 B1 | 2/2011 |
| EP | 2289820 A1 | 3/2011 |
| EP | 2308776 A1 | 4/2011 |
| EP | 2 205 133 B1 | 6/2011 |

(56) References Cited

FOREIGN PATENT DOCUMENTS

| | | |
|---|---|---|
| EP | 2 284 100 B1 | 6/2011 |
| EP | 2 284 101 B1 | 9/2011 |
| EP | 2 364 930 A2 | 9/2011 |
| EP | 2 151 313 B1 | 10/2011 |
| EP | 2 229 082 B1 | 12/2011 |
| EP | 2 012 994 B1 | 7/2012 |
| EP | 2 385 922 B1 | 8/2012 |
| EP | 2 489 609 A1 | 8/2012 |
| EP | 2 374 383 B1 | 11/2012 |
| EP | 2 573 008 A1 | 3/2013 |
| EP | 2 631 198 A1 | 8/2013 |
| EP | 2 631 199 A1 | 8/2013 |
| EP | 2 512 302 B1 | 9/2013 |
| EP | 2 682 028 A1 | 1/2014 |
| EP | 2 690 035 A1 | 1/2014 |
| EP | 2 712 824 A1 | 4/2014 |
| EP | 2 757 056 A1 | 7/2014 |
| EP | 2 516 296 A1 | 8/2014 |
| EP | 2 801 538 A1 | 11/2014 |
| EP | 2 334 564 B1 | 3/2015 |
| EP | 2 868 598 A1 | 5/2015 |
| EP | 3 023 360 B1 | 1/2018 |
| ES | 1137034 U | 3/2015 |
| ES | 1142506 U | 8/2015 |
| FR | 2973209 A1 | 10/2012 |
| GB | 2 503 697 B | 12/2014 |
| GB | 2 519 319 A | 4/2015 |
| GB | 2 503 774 B | 6/2015 |
| GB | 2 523 775 A | 9/2015 |
| WO | 2006045515 | 5/2006 |
| WO | WO-2006/045536 A1 | 5/2006 |
| WO | 2007113110 | 10/2007 |
| WO | WO-2007/122206 A1 | 11/2007 |
| WO | WO-2008/037642 A1 | 4/2008 |
| WO | 2009115474 A1 | 9/2009 |
| WO | WO-2009/128016 A1 | 10/2009 |
| WO | WO-2010/055465 A1 | 5/2010 |
| WO | WO-2010/084475 A2 | 7/2010 |
| WO | WO-2010/115970 A1 | 10/2010 |
| WO | WO-2010/116284 A2 | 10/2010 |
| WO | WO-2010/128844 A1 | 11/2010 |
| WO | 2010137946 | 12/2010 |
| WO | WO-2010/137952 A1 | 12/2010 |
| WO | WO-2011/000005 A1 | 1/2011 |
| WO | WO-2011/010263 A1 | 1/2011 |
| WO | 2011092301 | 8/2011 |
| WO | WO-2011/113854 A2 | 9/2011 |
| WO | WO-2012/011053 A1 | 1/2012 |
| WO | WO-2012/013556 A1 | 2/2012 |
| WO | WO-2012/038063 A1 | 3/2012 |
| WO | WO-2012/045184 A1 | 4/2012 |
| WO | 2012100836 | 8/2012 |
| WO | WO-2012/110323 A1 | 8/2012 |
| WO | WO-2012/118367 A1 | 9/2012 |
| WO | WO-2012/120459 A1 | 9/2012 |
| WO | WO-2012/122329 A1 | 9/2012 |
| WO | WO-2012/123857 A1 | 9/2012 |
| WO | WO-2012/144885 A1 | 10/2012 |
| WO | WO-2013/043048 A1 | 3/2013 |
| WO | 2013053655 A1 | 4/2013 |
| WO | WO-2013/046014 A1 | 4/2013 |
| WO | WO-2013/060654 A1 | 5/2013 |
| WO | WO-2013/060918 A1 | 5/2013 |
| WO | WO-2013/068242 A1 | 5/2013 |
| WO | WO-2013/079811 A1 | 6/2013 |
| WO | WO-2013/132435 A1 | 9/2013 |
| WO | WO-2013/135937 A2 | 9/2013 |
| WO | WO-2013/136209 A1 | 9/2013 |
| WO | WO-2013/136240 A1 | 9/2013 |
| WO | 2013157927 A | 10/2013 |
| WO | WO-2013/144838 A1 | 10/2013 |
| WO | WO-2013/153169 A2 | 10/2013 |
| WO | WO-2013/157924 A1 | 10/2013 |
| WO | WO-2013/164669 A1 | 11/2013 |
| WO | WO-2013/189923 A1 | 12/2013 |
| WO | WO-2013/190426 A1 | 12/2013 |
| WO | WO-2014/001584 A1 | 1/2014 |
| WO | WO-2014/012779 A2 | 1/2014 |
| WO | WO-2014/012783 A2 | 1/2014 |
| WO | WO-2014/033344 A1 | 3/2014 |
| WO | WO-2014/053638 A1 | 4/2014 |
| WO | WO-2014/067507 A2 | 5/2014 |
| WO | WO-2014/072942 A2 | 5/2014 |
| WO | WO-2014/076041 A1 | 5/2014 |
| WO | WO-2014/118812 A1 | 8/2014 |
| WO | WO-2014/125390 A1 | 8/2014 |
| WO | WO-2014/128315 A1 | 8/2014 |
| WO | WO-2014/167526 A1 | 10/2014 |
| WO | WO-2014/184651 A1 | 11/2014 |
| WO | WO-2014/184652 A1 | 11/2014 |
| WO | WO-2014/184653 A1 | 11/2014 |
| WO | WO-2014/191412 A1 | 12/2014 |
| WO | WO-2014/191413 A1 | 12/2014 |
| WO | WO-2014/198474 A1 | 12/2014 |
| WO | WO-2014/202105 A1 | 12/2014 |
| WO | WO-2015/011683 A1 | 1/2015 |
| WO | WO-2015/056202 A1 | 4/2015 |
| WO | WO-2015/075584 A1 | 5/2015 |
| WO | WO-2015/082982 A1 | 6/2015 |
| WO | WO-2015/087180 A1 | 6/2015 |
| WO | WO-2015/101394 A1 | 7/2015 |
| WO | WO-2015/104171 A1 | 7/2015 |
| WO | WO-2015/104172 A1 | 7/2015 |
| WO | WO-2015/128527 A1 | 9/2015 |
| WO | WO-2015/128799 A1 | 9/2015 |
| WO | WO-2015/128827 A1 | 9/2015 |
| WO | WO-2015/180960 A1 | 12/2015 |
| WO | WO-2016/041596 A1 | 3/2016 |
| WO | 2016074189 A1 | 5/2016 |
| WO | 2016186492 A1 | 11/2016 |
| WO | WO-2016/186488 A1 | 11/2016 |
| WO | WO-2016/186489 A1 | 11/2016 |
| WO | WO-2016/186491 A1 | 11/2016 |
| WO | WO-2016/186496 A1 | 11/2016 |
| WO | WO-2017/074189 A1 | 5/2017 |

OTHER PUBLICATIONS

International Search Report and Written Opinion, PCT/NL2016/050341, Koninklijke Douwe Egberts B.V., 13 pages (dated Oct. 27, 2016).
International Search Report and Written Opinion, PCT/NL2016/050342, Koninklijke Douwe Egberts B.V., 13 pages (dated Nov. 8, 2016).
International Search Report and Written Opinion, PCT/NL2016/050344, Koninklijke Douwe Egberts B.V., 13 pages (dated Oct. 27, 2016).
U.S. Appl. No. 15/811,524, filed Nov. 13, 2017, Koninklijke Douwe Egberts B.V.
U.S. Appl. No. 15/811,525, filed Nov. 13, 2017, Koninklijke Douwe Egberts B.V.
U.S. Appl. No. 15/811,528, filed Nov. 13, 2017, Koninklijke Douwe Egberts B.V.
U.S. Appl. No. 15/813,054, filed Nov. 14, 2017, Koninklijke Douwe Egberts B.V.
U.S. Appl. No. 15/963,258, filed Apr. 26, 2018, Koninklijke Douwe Egberts B.V.
International Search Report and Written Opinion, PCT/NL2016/050350, Koninklijke Douwe Egberts B.V., 13 pages (dated Nov. 2, 2016).
International Search Report and Written Opinion, PCT/NL2016/050749, Koninklijke Douwe Egberts B.V., 10 pages (dated Feb. 22, 2017).
Nullity Action on DE 202016106171.7, 96 pages (Dec. 20, 2019).
International Preliminary Report on Patentability, PCT/NL2016/050341, Koninklijke Douwe Egberts B.V., 8 pages (dated Nov. 21, 2017).
International Preliminary Report on Patentability, PCT/NL2016/050344, Koninklijke Douwe Egberts B.V., 8 pages (dated Nov. 21, 2017).

(56) References Cited

OTHER PUBLICATIONS

International Preliminary Report on Patentability, PCT/NL2016/050346, Koninklijke Douwe Egberts B.V., 7 pages (dated Nov. 21, 2017).

International Preliminary Report on Patentability, PCT/NL2016/050350, Koninklijke Douwe Egberts B.V., 8 pages (dated Nov. 21, 2017).

International Preliminary Report on Patentability, PCT/NL2016/050749, Koninklijke Douwe Egberts B.V., 7 pages (dated May 1, 2018).

International Preliminary Report on Patentability, PCT/NL2016/050342, Koninklijke Douwe Egberts B.V., 8 pages (dated Nov. 21, 2017).

Notice of Opposition, dated Jan. 24, 2020 for EP Application No. 16744560.0, 41 pages.

"Nespresso", Wikipedia Archive, published Nov. 29, 2012, 8 pages.

International Preliminary Report on Patentability, PCT/NL2016/050349, 7 pages (dated Nov. 21, 2017).

International Preliminary Report on Patentability, PCT/NL2017/050663, 7 pages (dated Apr. 9, 2019).

International Search Report and Written Opinion, PCT/NL2017/050300, 13 pages (dated Jul. 19, 2017).

International Search Report and Written Opinion, PCT/NL2017/050301, 15 pages (dated Jul. 19, 2017).

International Search Report and Written Opinion, PCT/NL2017/050659, 12 pages (dated Jan. 17, 2018).

International Search Report and Written Opinion, PCT/NL2017/050663, 12 pages (dated Jan. 17, 2018).

International Search Report and Written Opinion, PCT/NL2018/050486, 14 pages (dated Oct. 18, 2018).

EPO Communication pursuant to Article 94(3) EPC, dated Jan. 17, 2018, EP Application No. 16744557.6, 4 pgs.

Reply to Jan. 17, 2018 communication pursuant to Art. 94(3) EPC, dated Jul. 19, 2018, EP Application No. 16744557.6, 19 pgs.

EPO Communication pursuant to Article 94(3) EPC, dated Dec. 20, 2018, EP Application No. 16744557.6, 3 pgs.

Reply to Dec. 20, 2018 communication pursuant to Art. 94(3) EPC, dated Jul. 1, 2019, EP Application No. 16744557.6, 53 pgs.

Third Party Observation, dated May 14, 2020, EP Application No. 16744557.6, 5 pgs.

EPO Communication pursuant to Article 94(3) EPC, dated Mar. 18, 2022, EP Application No. 16744557.6, 4 pgs.

Reply to Mar. 18, 2022 communication pursuant to Art. 94(3) EPC, dated Sep. 28, 2022, EP Application No. 16744557.6, 13 pgs.

* cited by examiner

CAPSULE, A SYSTEM FOR PREPARING A POTABLE BEVERAGE FROM SUCH A CAPSULE AND USE OF SUCH A CAPSULE IN A BEVERAGE PREPARATION DEVICE

CROSS-REFERENCE TO RELATED APPLICATIONS

This application is a continuation of International Application Number PCT/NL2016/050346 filed May 13, 2016, which claims the benefit of and priority to International Application Number PCT/NL2015/050350 filed May 15, 2015. The entire contents of all of which are incorporated herein by reference.

BACKGROUND

The invention relates to a capsule containing a substance for the preparation of a potable beverage by extracting and/or dissolving the substance by means of supplying a fluid under pressure into the capsule, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with an enclosing member of a beverage preparation device if the closed capsule is positioned in the enclosing member of the beverage preparation device and the enclosing member is closed by means of a closing member of the beverage preparation device, such as an extraction plate of the beverage preparation device, such that the outwardly extending flange of the closed capsule and at least a portion of the sealing member of the closed capsule are sealingly engaged between the enclosing member and the closing member of the beverage preparation device, wherein the enclosing member of the beverage preparation device comprises an annular element having a central annular element axis and a free contact end, said free contact end of the annular element optionally being provided with a plurality of radially extending open grooves.

The invention also relates to a system for preparing a potable beverage from a capsule using a fluid supplied under pressure into the capsule comprising:
 a beverage preparation device comprising an enclosing member for receiving the capsule, wherein the enclosing member comprises fluid supply means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves;
 a capsule containing a substance for the preparation of a potable beverage by extracting and/or dissolving the substance by means of the fluid supplied under pressure into the capsule by the fluid supply means of the beverage preparation device, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device.

Furthermore the invention relates to the use of a capsule in a beverage preparation device comprising an enclosing member for receiving the capsule, wherein the enclosing member comprises fluid supply means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves; wherein the capsule contains a substance for the preparation of a potable beverage by extracting and/or dissolving the substance by means of the fluid supplied under pressure into the capsule by the fluid supply means of the beverage preparation device, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device.

Such a capsule, system and use are known from EP-B-1 700 548. In the known system the capsule is provided with a sealing member having the shape of a step, i.e. a sudden increase of the diameter of the side wall of the capsule, and the enclosing member of this known system has a sealing surface acting on the sealing member to provide deflection of the sealing member, the sealing surface being inclined so that the deflection of the sealing member is an inwards and downwards deformation of the step. Furthermore in the known system the enclosing member comprises a capsule holder and a manually operated or an automatic mechanism for relative displacement of the enclosing member and the capsule holder. The manually operated or an automatic mechanism applies a force on the sealing member of the capsule when the enclosing member closes on the capsule holder. This force should ensure the fluid tight seal between the enclosing member and the capsule. Because the manually operated or an automatic mechanism is arranged to be moved relative to the base, the sealing capabilities of the system can depend on the pressure of the fluid supplied by the fluid supply means. If the pressure of the fluid increases, the force between the sealing member of the capsule and the free end of the enclosing member increases too and thereby the force between the sealing member of the capsule and the free end of the enclosing member increases also. Such a system is described further on. The sealing member of the capsule must be arranged such that upon reaching the maximum fluid pressure in the enclosing member the sealing member should still provide a fluid sealing contact between the enclosing member and the capsule. However, the sealing member must also be arranged such that prior to, or at the start of, brewing when the pressure of the fluid in the enclosing member outside the capsule is relatively low, the sealing member also provides a fluid sealing contact between the enclosing member and the capsule. If at the start of brewing, there would not exist a fluid sealing contact between the capsule and the enclosing member, leakage will occur. However, if leakage occurs there is a real chance that the pressure in the enclosing member and outside the capsule will not sufficiently increase for increasing the force on the sealing member by means of the free end of the enclosing member if the manually operated or an automatic mechanism moves the enclosing member towards the capsule holder. Only if there is a sufficient initial sealing, the pressure in the enclosing member will increase whereby also the force of the free end of the enclosing member acting on the sealing member of the capsule will increase for providing a sufficient fluid sealing contact at also the increased fluid pressure. Moreover, this increased fluid pressure outside the capsule also provides an increased fluid pressure inside the capsule which is essential if the capsule is provided with a cover which is arranged to tear open on relief members of the capsule holder (also called an extraction plate) of the beverage preparation device under the influence of fluid pressure in the capsule.

SUMMARY

It follows from the above that the sealing member is a member which is very critical in design. It should be able to provide a fluid sealing contact between the enclosing member and the capsule at a relatively low fluid pressure if only a relatively small force is applied on the sealing member by means of the free end of the enclosing member but it should also provide a fluid sealing contact at a much higher fluid pressure in the enclosing member outside the capsule if a higher force is applied by means of the free end of the enclosing member to the sealing member of the capsule. In particular when the free contact end of the enclosing member is provided with radially extending open grooves which act as air inlet passage once the force between the enclosing member and the capsule holder is released so that it is easier for a user to take out the capsule, the sealing member must also be able to 'close' the radially extending open grooves to provide an effective seal.

It is an object of the invention to provide an alternative sealing member which is relatively easy to manufacture, which is environmentally friendly if the capsule is disposed of after use and/or which provides a satisfactory sealing both at a relatively low fluid pressure if only a relatively small force is applied on the sealing member by means of the free end of the enclosing member (sometimes also called initial seal) and at a much higher fluid pressure if a higher force is applied (e.g. during brewing) by means of the free end of the enclosing member to the sealing member of the capsule, even in case of an enclosing member of which the free contact end is provided with radially extending open grooves.

The invention has also as an object to provide an alternative system for preparing a potable beverage from a capsule and to provide an alternative use of a capsule in a beverage preparation device.

In accordance with the invention there is provided in a first aspect a capsule containing a substance for the preparation of a potable beverage by extracting and/or dissolving the substance by means of supplying a fluid under pressure into the capsule, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with an enclosing member of a beverage preparation device if the capsule is positioned in the enclosing member of the beverage preparation device and the enclosing member is closed by means of a closing member of the beverage preparation device, such as an extraction plate of the beverage preparation device, such that the outwardly extending flange of the capsule and at least a portion of the sealing member of the capsule are sealingly engaged between the enclosing member and the closing member of the beverage preparation device, wherein the enclosing member of the beverage preparation device comprises an annular element having a central annular element axis and a free contact end, said free contact end of the annular element optionally being provided with a plurality of radially extending open grooves, characterized in that, the sealing member comprises a separate crushable element provided on the surface of the outwardly extending flange opposite the cover. Since the sealing member comprises a separate crushable element provided on the surface of the outwardly extending flange opposite the cover the capsule as well as the separate crushable element are relatively easy to manufacture. Furthermore by means of the separate crushable element a satisfactory sealing with the free contact end provided with radially extending open grooves can be provided. In addition the separate crushable element can facilitate positioning of the capsule inside the beverage preparation device.

In this application the existence of a fluid sealing contact means that 0-6%, preferably 0-4%, more preferably 0-2.5% of the total fluid supplied to the enclosing member for preparing the beverage may leak away due to leakage between the free contact end and the sealing member of the capsule.

The invention is in particular advantageous when in an embodiment of a capsule the capsule contains an extractable product as substance for the preparation of a potable beverage, said extractable product preferably being 5-20 grams, preferably 5-10 grams, more preferably 5-7 grams of roasted and ground coffee.

In an embodiment of a capsule according to the invention which is in particular easy to manufacture the outer diameter of the outwardly extending flange of the capsule is larger than the diameter of the bottom of the capsule. Preferably, the outer diameter of the outwardly extending flange is approximately 37.1 mm and the diameter of the bottom of the capsule is about 23.3 mm.

The invention is in particular advantageous when in an embodiment of a capsule the thickness of the aluminum capsule body is such that it is deformed easily if the capsule is positioned in the enclosing member of the beverage preparation device and the enclosing member is closed by means of a closing member of the beverage preparation device, preferably the thickness of the aluminum capsule body is 20 to 200 micrometer, preferably 100 micrometer.

The invention is in particular advantageous when in an embodiment of a capsule the thickness of the aluminum cover is 15 to 65 micrometer, preferably 30 to 45 micrometer and most preferred 39 micrometer.

In an embodiment of a capsule according to the invention the wall thickness of the aluminum cover is smaller than the wall thickness of the aluminum capsule body.

In a further embodiment of a capsule according to the invention the aluminum cover is arranged to tear open on a closing member of the beverage preparation device, such as an extraction plate of the beverage preparation device under the influence of fluid pressure in the capsule.

In an embodiment of a capsule according to the invention which is in particular easy to manufacture the side wall of the aluminum capsule body has a free end opposite the bottom, the outwardly extending flange extending from said free end of the side wall in a direction at least substantially transverse to the central capsule body axis. Preferably, the outwardly extending flange comprises a curled outer edge, which is beneficial in obtaining for a satisfactory sealing with the free contact end provided with radially extending open grooves.

The radius about the central capsule body axis of an inner edge of the curled outer edge of the outwardly extending flange is preferably at least 32 mm, so that clearance from the annular end surface of the enclosure member is ensured. It is then preferred that the sealing member is positioned between the free end of the side wall of the aluminum capsule body and an inner edge of the curled outer edge of the outwardly extending flange to obtain a still further satisfactory sealing.

To ensure that the curled outer edge does not interfere with operation of a wide variety of commercially available and future beverage preparation apparatuses, the curled outer edge of the outwardly extending flange has a largest dimension of about 1.2 millimeter.

The invention is in particular beneficial for capsules of which the inner diameter of the free end of the side wall of the aluminum capsule body is about 29.5 mm. The distance between the free end of the side wall of the aluminum capsule body and an outermost edge of the outwardly extending flange can be about 3.8 millimeter. The preferred height of the aluminum capsule body is about 28.4 mm.

In an embodiment of a capsule according to the invention which after use is easier for a user to take out of a beverage preparation device the aluminum capsule body is truncated, wherein preferably the side wall of the aluminum capsule body encloses an angle with a line transverse to the central capsule body axis of about 97.5°.

In an advantageous embodiment of a capsule according to the invention the bottom of the aluminum capsule body has a largest inner diameter of about 23.3 mm. It is preferred that the bottom of the aluminum capsule body is truncated, preferably having a bottom height of about 4.0 mm and that the bottom further has a generally flat central portion opposite the cover having a diameter of about 8.3 mm.

In practically all cases a satisfactory seal can be obtained in an embodiment of a capsule according to the invention in which the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm.

In a preferred embodiment of a capsule according to the invention the capsule comprises an inner surface, and wherein on the inner surface of at least the side wall of the capsule an inner coating is provided. In particular when the capsule is manufactured by deep drawing the inner coating facilitates the deep drawing process. In case the aluminum cover of the capsule is attached to the outwardly extending flange by means of a sealing lacquer it is then in particular advantageous when said inner coating being composed of the same material as the sealing lacquer.

In a further embodiment of a capsule according to the invention the capsule comprises an outer surface, wherein on the outer surface of the capsule a color lacquer is provided. In order to facilitate in deep drawing it is preferred to provide on an outer surface of the color lacquer an outer coating.

Although the separate crushable element could be provided loosely on the outwardly extending flange, it is preferred when the separate crushable element is attached to the surface of the outwardly extending flange opposite the cover. For such attachment any available attachment can be envisaged.

In an embodiment of a capsule according to the invention the separate crushable element is made of aluminum.

In an embodiment of a capsule according to the invention which is easy to manufacture the outwardly extending flange is flat and extends transversely to the central capsule body axis.

In a further embodiment of a capsule according to the invention the separate crushable element is an annular $\Omega$-shaped ring. Preferably the annular $\Omega$-shaped ring has a height of 0.1-0.3 mm, preferably 0.2-2.0 mm, more preferably 0.8-1.2 mm and a width in the same ranges.

In an alternative embodiment of a capsule according to the invention the separate crushable element is spiral shaped annular element. Preferably the spiral shaped annular element has a height of 0.1-0.3 mm, preferably 0.2-2.0 mm, more preferably 0.8-1.2 mm and a width in the same ranges.

In a further alternative embodiment of a capsule according to the invention the separate crushable element is zigzag shaped. Preferably, the zigzag shaped element has a height of 0.1-0.3 mm, preferably 0.2-2.0 mm, more preferably 0.8-1.2 mm and a width in the same ranges.

These three embodiments appear to provide a satisfactory seal during use of the capsule.

In a still further embodiment of a capsule according to the invention the separate crushable element is positioned such that the free contact end of the annular element comes into contact with the separate crushable element.

In the light of this invention with crushable element is meant an element which is deformable if the capsule is positioned in the enclosing member of the beverage preparation device and the enclosing member is closed by means of a closing member of the beverage preparation device. Further, in the light of this invention with separate crushable element is meant a crushable element which is not integrally formed together with the aluminum capsule body.

In a preferred embodiment of a capsule according to the invention the sealing separate crushable element is formed by aluminum. Please note that with aluminum also aluminum alloys are meant.

In accordance with the invention there is provided in a second aspect a system for preparing a potable beverage from a capsule using a fluid supplied under pressure into the capsule comprising:
- a beverage preparation device comprising an enclosing member for receiving the capsule, wherein the enclosing member comprises fluid supply means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radially extending open grooves;
- a capsule containing a substance for the preparation of a potable beverage by extracting and/or dissolving the substance by means of the fluid supplied under pressure into the capsule by the fluid supply means of the beverage preparation device, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device, characterized in that, the sealing member comprises a separate crushable element provided on the surface of the outwardly extending flange opposite the cover. Since the sealing member comprises a separate crushable element provided on the surface of the outwardly extending flange opposite the cover the capsule as well as the separate crushable element are relatively easy to manufacture. Furthermore by means of the separate crushable element a satisfactory sealing with the free contact end provided with radially extending open grooves can be provided.

Regarding the preferred embodiments of the system as mentioned in the dependent claims which relate to the same features as the features of the dependent claims of the capsule reference is made to the above.

The invention is particularly suitable in a system according to the invention wherein, in use, the maximum fluid pressure in the enclosing member of the beverage preparation device is in the range of 6-20 bar, preferably between 12 and 18 bar. Even at these high pressures a satisfactory seal between capsule and beverage preparation device can be obtained.

Preferably the system is arranged such that, in use, during brewing, a free end of the enclosing member of the beverage preparation device exerts a force F2 on the sealing member of the capsule to provide a fluid sealing contact between the outwardly extending flange of the capsule and the enclosing member of the beverage preparation device, wherein F2 is in the range of 500-1500 N preferably in the range of 750-1250 N when the fluid pressure P2 in the enclosing member of the beverage preparation device outside the capsule is in the range of 6-20 bar, preferably between 12 and 18 bar. In particular the system is arranged such that, in use, prior to or at the start of brewing, a free end of the enclosing member of the beverage preparation device exerts a force F1 on the sealing member of the capsule to provide a fluid sealing contact between the outwardly extending flange of the capsule and the enclosing member of the beverage preparation device, wherein F1 is in the range of 30-150 N preferably in the range of 40-150 N, more preferably 50-100 N, when the fluid pressure P1 in the enclosing member of the beverage preparation device outside the capsule is in the range of 0.1-4 bar, preferably between 0.1-1 bar.

In an embodiment of a system according to the invention wherein the plurality of radially extending open grooves are uniformly spaced relative to each other in tangential direction of the free contact end of the annular element of the beverage preparation device so that it is easier for a user to take out the capsule while a satisfactory seal between capsule and beverage preparation device can still be provided.

In an advantageous embodiment of a system according to the invention the longest tangential width of each groove (top to top, i.e. equal to the groove to groove pitch) is 0.9-1.1 mm, preferably 0.95 to 1.05 mm, more preferably 0.98 to 1.02 mm, wherein a maximal height of each groove in an axial direction of the enclosing member of the beverage preparation device is 0.01-0.09 mm, preferably 0.03 to 0.07 mm, more preferably 0.045 to 0.055 mm, most preferred 0.05 mm and wherein the number of grooves is 90 to 110, preferably 96. The radial width of the annular end surface at the location of the grooves may for instance be 0.05-0.9 mm, preferably 0.2-0.7 mm and more preferably 0.3-0.55 mm.

The invention is in particular suitable when applied to an embodiment of system according to the invention in which during use when the closing member of the beverage preparation device closes the enclosing member of the beverage preparation device, at least the free contact end of the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device. The enclosing member may comprise a first part and a second part wherein the second part comprises the free contact end of the enclosing member wherein the second part can move relative to the first part between a first and second position. The second part can move from the first position towards the second position in the direction of the closing member under the influence of fluid pressure in the enclosing member. The force F1 as discussed above may be reached if the second part is in the first position with a fluid pressure P1. The force F2 as discussed above may be reached if the second part is moved towards the second position under the influence of the fluid pressure P2 in the enclosing member.

In an embodiment of a system according to the invention the fluid supply means are arranged for supplying a flow of fluid in the range of 0.5-2 ml/s, wherein the fluid sealing contact provided by the sealing member provides a leakage percentage of less then 4%, preferably less than 2.5% of said flow. The sealing member provides a satisfactory seal when the leakage percentage is within these ranges.

In accordance with the invention there is provided in a third aspect a use of a capsule according to the invention in a beverage preparation device comprising an enclosing member for receiving the capsule, wherein the enclosing member comprises fluid supply means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, said free contact end of the annular element optionally being provided with a plurality of radial grooves; wherein the capsule contains a substance for the preparation of a potable beverage by extracting and/or dissolving the substance by means of the fluid supplied under pressure into the capsule by the fluid supply means of the beverage preparation device, wherein the capsule comprises an aluminum capsule body having a central capsule body axis, said aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device. Regarding the advantage of the inventive use and the preferred embodiments of the use as mentioned in the dependent claims which relate to the same features as the features of the dependent claims of the capsule or the dependent claims of the system reference is made to the above.

BRIEF DESCRIPTION OF THE DRAWINGS

The invention will now be further elucidated by means of, non-limiting, examples referring to the drawing, in which.

In the Figures and the following description, like reference numerals refer to like features.

DETAILED DESCRIPTION

Figure 1:
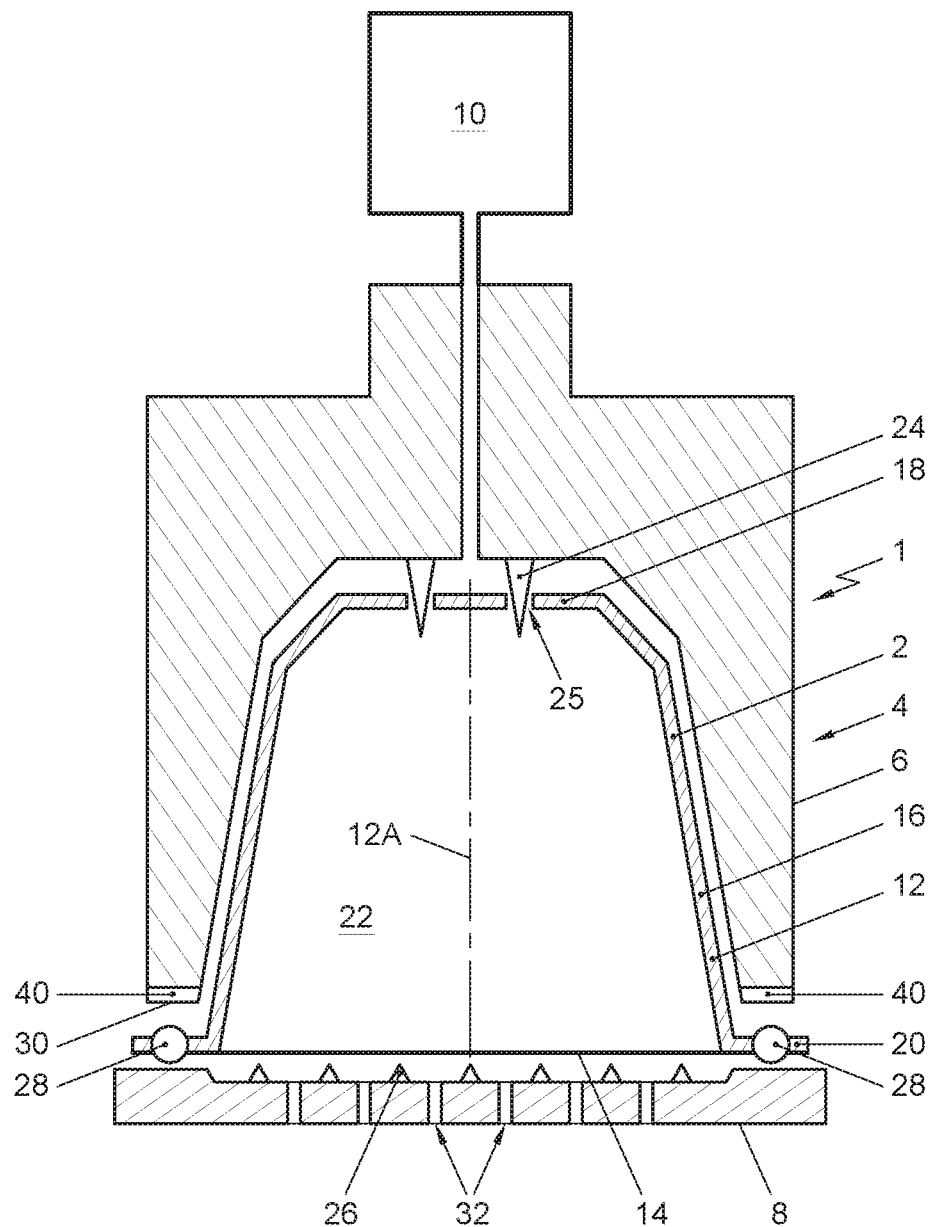
FIG. 1 shows a schematic representation of an embodiment of a system according to the invention.

FIG. 1 shows a schematic representation, in cross sectional view, of an embodiment of a system 1 for preparing a potable beverage from a capsule using a fluid supplied under pressure into the capsule. The system 1 comprises a capsule 2, and a beverage preparation device 4. The device 4 comprises enclosing member 6 for holding the capsule 2. The device 4 further comprises a closing member, such as an extraction plate, 8 for supporting the capsule 2.

In FIG. 1 a gap is drawn between the capsule 2, the enclosing member 6 and the extraction plate 8 for clarity. It will be appreciated that, in use, the capsule 2 may lie in contact with the enclosing member 6 and the extraction plate member 8. Commonly, the enclosing member 6 has a shape complementary to the shape of the capsule 2. The device 4 further comprises a fluid supply means 10 for supplying an amount of a fluid, such as water, under a pressure in the range of 6-20 bar, preferably between 12 and 18 bar, to the exchangeable capsule 2.

In the example shown in FIG. 1, the exchangeable capsule 2 comprises an aluminum capsule body 12 having a central capsule body axis 12A and an aluminum cover 14. In the present context, the meaning of 'aluminum' is understood to also include aluminum alloy. In this example, the aluminum capsule body 12 comprises a side wall 16, a bottom 18 closing the side wall 16 at a first end, and a outwardly extending flange 20 extending outwardly of the circumferential wall 16 at a second end opposite the bottom 18. The side wall 16, the bottom 18 and the cover 14 enclose an inner space 22 comprising a substance for the preparation of a potable beverage by extracting and/or dissolving the substance. Preferably the substance is an extractable substance, preferably 5-20 grams, preferably 5-10 grams, more preferably 5-7 grams of roasted and ground coffee for the preparation of a single beverage. The capsule is initially sealed, i.e. is hermetically closed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises cover piercing means 26, here embodied as protrusions of the closing member 8, for piercing the cover 14 of the capsule 2. The cover piercing means 26 may be arranged to tear the cover 14 once a (fluid) pressure inside the inner space 22 exceeds a threshold pressure and presses the cover 14 against the cover piercing means 26 with sufficient force. The aluminum cover 14 thus is arranged to tear open on the closing member 8 of the beverage preparation device under the influence of fluid pressure in the capsule.

Figure 3A:
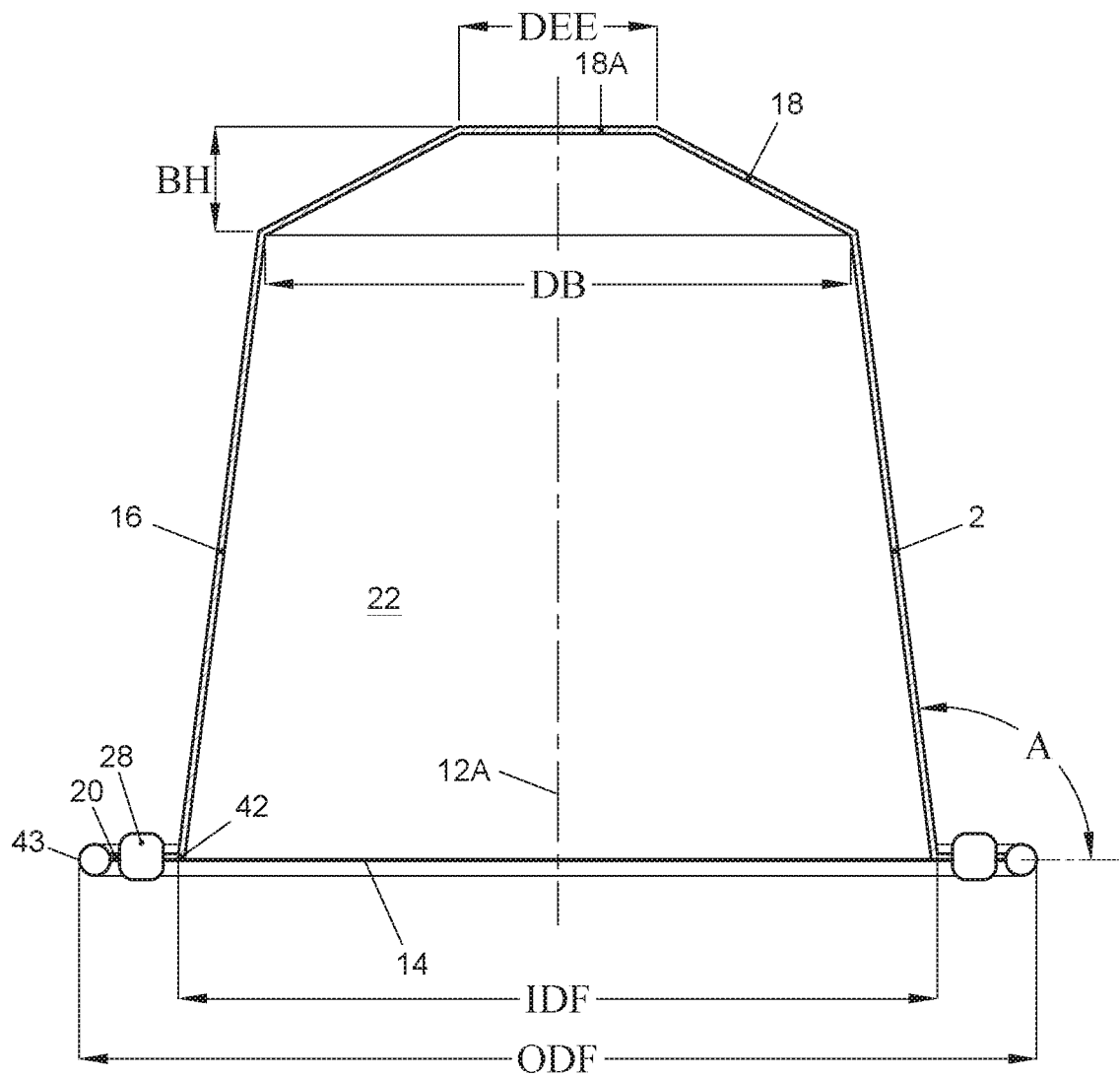
FIG. 3A in cross section shows an embodiment of a capsule according to the invention before use.
Figure 3B:
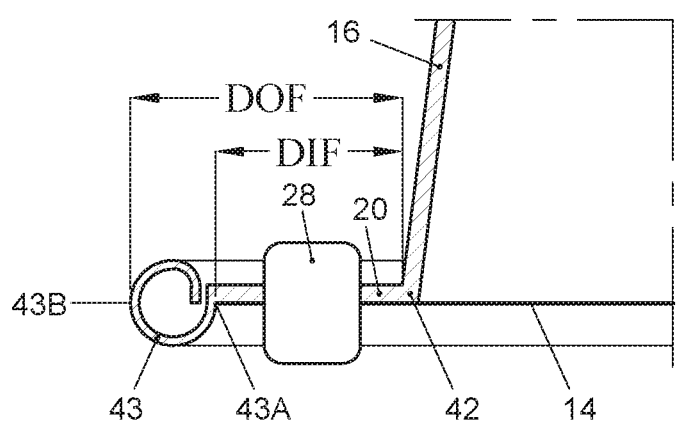
FIG. 3B shows an enlarged detail of a the capsule of FIG. 3A showing the outwardly extending flange and the sealing member.

The capsule 2 further comprises a sealing member 28, in FIGS. 1, 3A and 3B indicated as a general box but more detailed described with regard to FIGS. 4A to 4D, which sealing member 28 is arranged at the outwardly extending flange 20 for providing a fluid sealing contact with the enclosing member 6 if the capsule 2 is positioned in the enclosing member 6 and the enclosing member 6 is closed by means of the extraction plate 8, such that the outwardly extending flange 20 of the capsule 2 and at least a portion of the sealing member 28 are sealingly engaged between the enclosing member 6 and the extraction plate 8.

Figure 2:
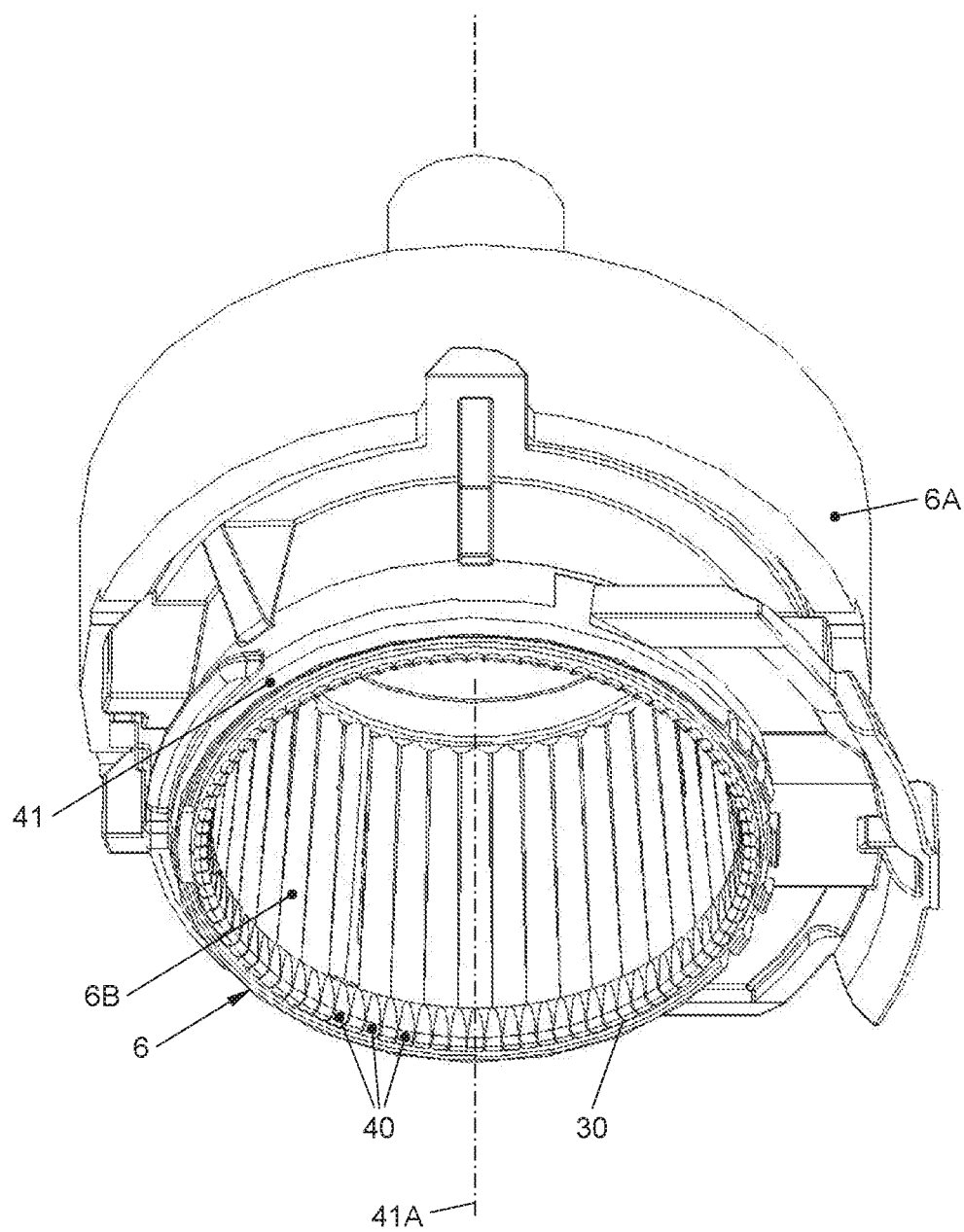
FIG. 2 in a perspective view shows an embodiment of a beverage preparation device of a system according to the invention showing the free contact end of the enclosing member of the beverage preparation device with the plurality of radially extending open grooves.

As shown in FIG. 2 the enclosing member 6 of the beverage preparation device comprises an annular element 41 having a central annular element axis 41A and a free contact end 30. The free contact end 30 of the annular element 41 is provided with a plurality of radially extending open grooves 40. The plurality of radially extending open grooves 40 are uniformly spaced relative to each other in tangential direction of the free contact end 30 of the annular element 41. The longest tangential width of each groove 40 is 0.9-1.1 mm, preferably 0.95 to 1.05 mm, more preferably 0.98 to 1.02 mm, wherein a maximal height of each groove 40 in an axial direction of the enclosing member 6 is 0.01-0.09 mm, preferably 0.03 to 0.07 mm, more preferably 0.045 to 0.055 mm, and most preferred 0.05 mm. The number of grooves 40 lies in the range of 90 to 110, preferably 96. Usually, the radial width of the free end at the location of the grooves is 0.05-0.9 mm, more specifically 0.2-0.7 mm, more specifically 0.3-0.55 mm.

An embodiment of a capsule according to the invention is shown more detailed in FIGS. 3A and 3B. In the shown embodiment the outer diameter ODF of the outwardly extending flange 20 is larger than the diameter DB of the bottom 18 of the capsule 2. In the shown embodiment the outer diameter ODF of the outwardly extending flange 20 is approximately 37.1 mm and the diameter DB of the bottom 18 is about 23.3 mm. The thickness of the aluminum capsule body 12 is such that it is deformed easily if the capsule is positioned in the enclosing member of the beverage preparation device and the enclosing member is closed by means of a closing member of the beverage preparation device, preferably the thickness of the aluminum capsule body is 100 micrometer, but in other embodiments the thickness can be 20 to 200 micrometer.

In the shown embodiment, the wall thickness of the aluminum cover 14 is 39 micrometer. The wall thickness of the aluminum cover 14 is preferably smaller than the thickness of the aluminum capsule body 12.

The side wall 16 of the aluminum capsule body 12 has a free end 42 opposite the bottom 18. The inner diameter IDF of the free end 42 of the side wall 16 of the aluminum capsule body 12 is about 29.5 mm. The outwardly extending flange 20 extends from that free end 42 in a direction at least substantially transverse to the central capsule body axis 12A. The outwardly extending flange 20 comprises a curled outer edge 43 which is beneficial for obtaining a seal between the capsule and the enclosing member. In the shown embodiment the curled outer edge 43 of the outwardly extending flange 20 has a largest dimension of about 1.2 millimeter. The distance DIF between the free end 42 of the side wall 16 of the aluminum capsule body 12 and an inner edge 43A of the curled outer edge 43 is about 2.7 mm, while the distance DOF between the free end 42 of the side wall 16 of the aluminum capsule body 12 and an outermost edge 43B of the outwardly extending flange 20 is about 3.8 millimeter. The radius about the central capsule body axis of the inner edge 43A of the curled outer edge 43 is preferably at least 32 mm.

As shown in FIGS. 3A and 3B the sealing member 28 is positioned between the free end of the side wall 16 of the aluminum capsule body 12 and the inner edge 43A of the curled outer edge 42 of the outwardly extending flange. The sealing member 28 is indicated as a general box, but will be described in more detail below. Irrespective of the embodiment of the sealing member 28 the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm for providing a correct seal.

As can be seen from FIG. 3A the aluminum capsule body 12 is truncated. In the embodiment shown, the side wall 16 of the aluminum capsule body 12 encloses an angle A with a line transverse to the central capsule body axis 12A of about 97.5°. The bottom 18 of the aluminum capsule body 12 has a largest inner diameter DB of about 23.3 mm. The bottom 18 of the aluminum capsule body 12 is also truncated, and in the shown embodiment has a bottom height BH of about 4.0 mm. The bottom 18 further has a generally flat central portion 18A opposite the cover 14, which central portion 18A has a diameter DEE of about 8.3 mm and in which central portion 18A the entrance opening(s) 25 may be made. The entrance openings may also be made in the truncated portion between the central portion 18A and the side wall 16. The total height TH of the aluminum capsule body 12 of the capsule is about 28.4 mm.

The system 1 shown in FIG. 1 is operated as follows for preparing a cup of a potable beverage, in the present example coffee, wherein the substance is roasted and ground coffee.

The capsule 2 is placed in the enclosing member 6. The extraction plate 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the cover 14 to deform and be pressed against the lid piercing means 26 of the extraction plate. Once the pressure reaches a certain level, the tear strength of the cover 14 will be surpassed and the cover 14 will rupture against the lid piercing means 26, creating exit openings. The prepared coffee will drain from the capsule 2 through the exit openings and outlets 32 (see FIG. 1) of the extraction plate 8, and may be supplied to a container such as a cup (not shown).

The system 1 is arranged such that prior to or at the start of brewing, the free end 30 of the enclosing member 6 exerts a force F1 on the sealing member 28 of the capsule 2 to provide a fluid sealing contact between the outwardly extending flange 20 of the capsule 2 and the enclosing member 6 of the beverage preparation device, wherein F1 is in the range of 30-150 N preferably 40-150 N, more preferably 50-100 N, when the fluid pressure P1 in the enclosing member of the beverage preparation device outside the capsule is in the range of 0.1-4 bar, preferably 0.1-1 bar. During brewing, the free end 30 of the enclosing member 6 exerts a force F2 on the sealing member 28 of the capsule 2 to provide a fluid sealing contact between the outwardly extending flange 20 of the capsule 2 and the enclosing member 6, wherein the force F2 is in the range of 500-1500 N, preferably in the range of 750-1250 N, when the fluid pressure P2 in the enclosing member 6 of the beverage preparation device outside the capsule 2 is in the range of 6-20 bar, preferably between 12 and 18 bar. In the shown embodiment the free contact end of enclosing member 6 can move relative to the extracting plate 8 under the effect of the pressure of the fluid in the enclosing member 6 device towards the extraction plate 8 for applying the maximum force F2 between the outwardly extending flange 20 and the free end 30 of the enclosing member 6. This movement can take place during use, i.e. in particular at the start of brewing and during brewing. The enclosing member 6 has a first part 6A and a second part 6B wherein the second part comprises the free contact end 30. The second part 6B can move relative to the first part 6A between a first and second position. The second part 6B can move from the first position towards the second position in the direction of the closing member 8 under the influence of fluid pressure in the enclosing member 6. The force F1 as discussed above may be reached if the second part 6B is in the first position with a fluid pressure P1. The force F2 as discussed above may be reached if the second part 6B is moved towards the second position under the influence of the fluid pressure P2 in the enclosing member 6.

Figure 3C:
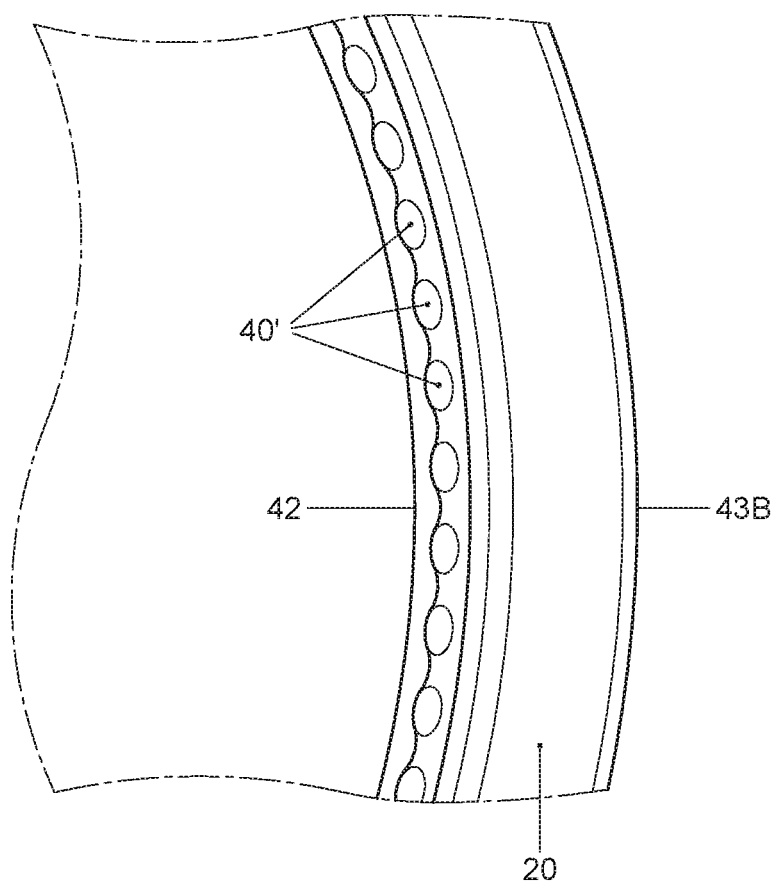
FIG. 3C shows an enlarged detail of the outwardly extending flange of the capsule in FIGS. 3A and 3B after use.

As a result of the force applied the sealing member 28 of the capsule according to the invention undergoes a plastic deformation and closely conforms to the grooves 40 of the free contact end 30 and thus provides a fluid sealing contact between the enclosing member 6 and the capsule 3 at a relatively low fluid pressure during start up of brewing but also provides a fluid sealing contact at the much higher fluid pressure in the enclosing member outside the capsule during brewing. This close conformation to the grooves 40 of the enclosing member is indicated in FIG. 3C which shows the capsule 2 of the invention after use, and which clearly indicates that the outwardly extending flange 20 comprises deformations 40' which conform to the grooves 40 of the enclosing member.

Now exemplary embodiments of a sealing member comprising a separate crushable element 28 provided on the surface of the outwardly extending flange 20 opposite the cover 14 of the capsule 2 according to the invention will be described in more detail with regard to FIGS. 4A to 4D. In the shown embodiments the separate crushable element 28 is made of aluminum, but it will be clear that the invention is not restricted to the sole use of aluminum as material for the crushable element 28. In addition in the shown embodiments the outwardly extending flange is flat and extends transversely to the central capsule body axis. It will be clear that in different embodiment the outwardly extending flange can enclose an angle with the normal to the central capsule body axis. Further, in the shown embodiments the separate crushable element is attached to the surface of the outwardly extending flange opposite the cover, for example by means of welding, but in other embodiments the separate crushable element could be provided loosely on the outwardly extending flange 20. Finally, in all the shown embodiments the separate crushable element is positioned such that if the capsule is positioned in the enclosing member of the beverage preparation device the free contact end of the annular element 6 is in contact with the separate crushable element 28.

Figure 4A:
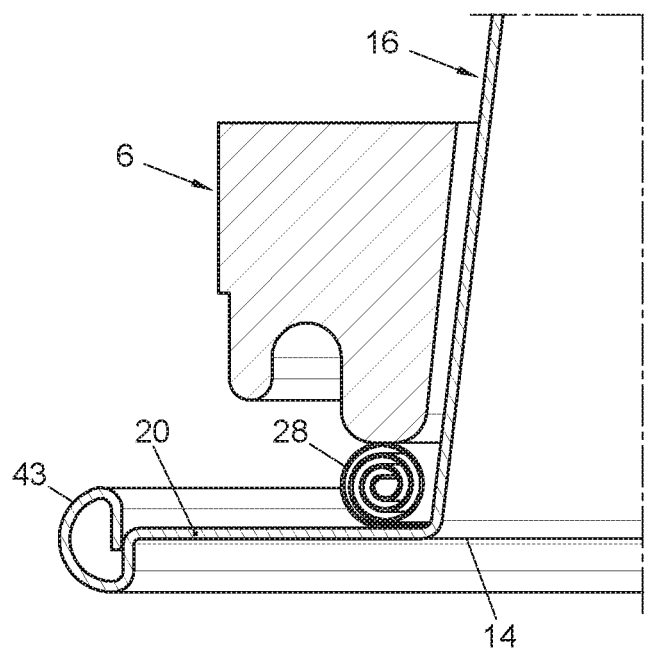
FIG. 4A shows a first embodiment of sealing member at the outwardly extending flange of a capsule according to the invention.

FIG. 4A shows a first embodiment of sealing member at the outwardly extending flange of a capsule according to the invention in which the separate crushable element 28 is spiral shaped annular element. The spiral shaped annular element has a height of 0.1-0.3 mm, preferably 0.2-2.0 mm, more preferably 0.8-1.2 mm and a width in the same ranges.

Figure 4B:
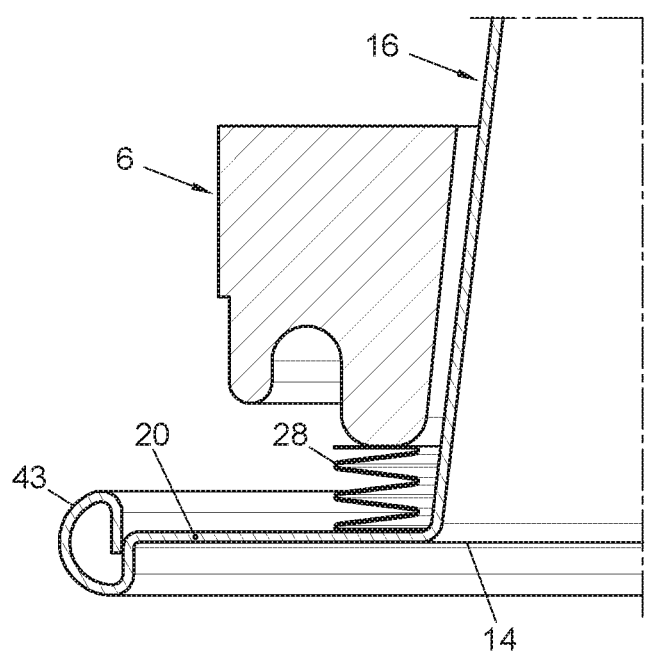
FIG. 4B shows a second embodiment of sealing member at the outwardly extending flange of a capsule according to the invention.

FIG. 4B shows a second embodiment of sealing member at the outwardly extending flange of a capsule according to the invention in which the separate crushable element 28 is zigzag shaped. The zigzag shaped element has a height of 0.1-0.3 mm, preferably 0.2-2.0 mm, more preferably 0.8-1.2 mm and a width in the same ranges.

Figure 4C:
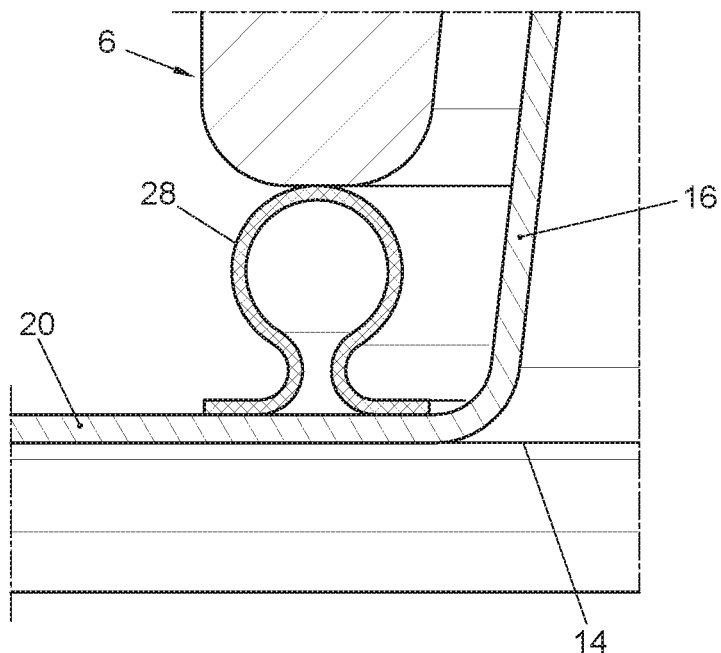
FIG. 4C shows a third embodiment of sealing member at the outwardly extending flange of a capsule according to the invention.

FIG. 4C shows a third embodiment of sealing member at the outwardly extending flange of a capsule according to the invention in which the separate crushable element 28 is an annular Ω-shaped ring. The annular Ω-shaped ring has a height of 0.1-0.3 mm, preferably 0.2-2.0 mm, more preferably 0.8-1.2 mm, and a width in the same ranges.

Figure 4D:
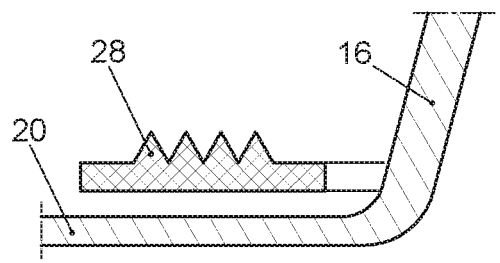
FIG. 4D shows a fourth embodiment of sealing member at the outwardly extending flange of a capsule according to the invention.

FIG. 4D shows a fourth embodiment of a separate crushable element 28 as sealing member at the outwardly extending flange 20 of a capsule according to the invention, in which the separate crushable element 28 is a ring having a number of protrusions arranged at a position to, during use, come into contact with the free end of the annular element of the enclosing member.

In the foregoing specification, the invention has been described with reference to specific examples of embodiments of the invention. It will, however, be evident that various modifications and changes may be made therein without departing from the broader spirit and scope of the invention as set forth in the appended claims.

The invention claimed is:

1. A system for preparing a potable beverage from a capsule using a fluid supplied under pressure into the capsule, the system comprising:

a beverage preparation device comprising an enclosing member for receiving the capsule, wherein the enclosing member comprises a fluid supply for supplying a fluid under pressure into the capsule, wherein the beverage preparation device further comprises a closing member for closing the enclosing member of the beverage preparation device, wherein the enclosing member of the beverage preparation device further comprises an annular element having a central annular element axis and a free contact end;

a capsule containing a substance for the preparation of a potable beverage by at least one of extracting and dissolving the substance by the fluid supplied under pressure into the capsule by the fluid supply of the beverage preparation device, wherein the capsule comprises an aluminum capsule body having a central capsule body axis, said aluminum capsule body being provided with a bottom, a side wall and an outwardly extending flange, wherein the outwardly extending flange comprises a curled outer edge, the capsule further comprising an aluminum cover attached to the outwardly extending flange, the aluminum cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, wherein the outwardly extending flange of the capsule and at least a portion of the sealing member of the capsule are sealingly engaged between the enclosing member and the closing member of the beverage preparation device, wherein the sealing member comprises a separate crushable element provided on the surface of the outwardly extending flange opposite the aluminum cover, said separate crushable element not being integrally formed together with the aluminum capsule body and wherein the sealing member is positioned between, and spaced from, the free end of the side wall of the aluminum capsule body and an inner edge of the curled outer edge of the outwardly extending flange and wherein the separate crushable element is made of aluminum, and wherein the separate crushable element has a void disposed between the flange and an uppermost portion of the separate crushable element, opposite the flange, and wherein the separate crushable element undergoes plastic deformation when subject to fluid sealing contact with the enclosing member.

2. The system according to claim 1, wherein the capsule contains an extractable product as substance for the preparation of a potable beverage, said extractable product being 5-20 grams of roasted and ground coffee.

3. The system according to claim 1, wherein the outer diameter of the outwardly extending flange of the capsule is larger than the diameter of the bottom of the capsule.

4. The system according to claim 3, wherein the outer diameter of the outwardly extending flange is 37.1 mm and the diameter of the bottom of the capsule is 23.3 mm.

5. The system according to claim 1, wherein the thickness of the aluminum capsule body is such that it is deformed if the capsule is positioned in the enclosing member of the beverage preparation device and the enclosing member is closed by means of a closing member of the beverage preparation device, the thickness of the aluminum capsule body being 20 to 200 micrometer or 100 micrometer.

6. The system according to claim 1, wherein the thickness of the aluminum cover is 15 to 65 micrometer.

7. The system according to claim 1, wherein the thickness of the aluminum cover is smaller than the thickness of the aluminum capsule body.

8. The system according to claim 1, wherein the aluminum cover is arranged to tear open on a closing member of the beverage preparation device under the influence of fluid pressure in the capsule.

9. The system according to claim 1, wherein the side wall of the aluminum capsule body has a free end opposite the bottom, the outwardly extending flange extending from said free end of the side wall in a direction transverse to the central capsule body axis.

10. The system according to claim 9, wherein an inner edge of the curled outer edge of the outwardly extending flange has a radius about the central capsule body axis of at least 32 mm.

11. The system according to claim 9, wherein the curled outer edge of the outwardly extending flange has a largest dimension of 1.2 millimeter.

12. The system according to claim 9, wherein the inner diameter of the free end of the side wall of the aluminum capsule body is 29.5 mm.

13. The system according to claim 9, wherein the distance between the free end of the side wall of the aluminum capsule body and an outermost edge of the outwardly extending flange is 3.8 millimeter.

14. The system according to claim 1, wherein a height of the aluminum capsule body is 28.4 mm.

15. The system according to claim 1, wherein the aluminum capsule body is truncated, wherein the side wall of the aluminum capsule body encloses an angle with a line transverse to the central capsule body axis of 97.5°.

16. The system according to claim 1, wherein the bottom of the aluminum capsule body has a largest inner diameter of 23.3 mm.

17. The system according to claim 16, wherein the bottom of the aluminum capsule body is truncated having a bottom height of 4.0 mm and wherein the bottom further has a generally flat central portion opposite the aluminum cover having a diameter of 8.3 mm.

18. The system according to claim 1, wherein the height of the sealing member is between 0.4 mm to 1.0 mm.

19. The system according to claim 1, wherein the aluminum cover of the capsule is attached to the outwardly extending flange by means of a sealing lacquer, said inner coating being composed of the same material as the sealing lacquer.

20. The system according to claim 1, wherein the capsule comprises an outer surface, and wherein on the outer surface of the capsule a color lacquer is provided.

21. The system according to claim 20, wherein on an outer surface of the color lacquer an outer coating is provided.

22. The system according to claim 1, wherein the separate crushable element is attached to the surface of the outwardly extending flange opposite the aluminum cover.

23. The system according to claim 1, wherein the outwardly extending flange is flat and extends transversely to the central capsule body axis.

24. The system according to claim 1, wherein the separate crushable element is an annular $\Omega$-shaped ring.

25. The system according to claim 24, wherein the annular $\Omega$-shaped ring has a height of 0.1-0.3 mm and a width in the same range.

26. The system according to claim 1, wherein the separate crushable element is a spiral shaped annular element.

27. The system according to claim 26, wherein the spiral shaped annular element has a height of 0.1-0.3 mm and a width in the same range.

28. The system according to claim 1, wherein the separate crushable element is zigzag shaped.

29. The system according to claim 28, wherein the zigzag shaped element has a height of 0.1-0.3 mm and a width in the same range.

30. The system according to claim 1, wherein the separate crushable element is positioned such that if the capsule is positioned in the enclosing member of the beverage preparation device the free contact end of the annular element is in contact with the separate crushable element.

31. The system according to claim 1, wherein, in use, the maximum fluid pressure in the enclosing member of the beverage preparation device is in the range of 6-20 bar.

32. The system according to claim 31, wherein the system is arranged such that, in use, during brewing, a free end of the enclosing member of the beverage preparation device exerts a force F2 on the sealing member of the capsule to provide a fluid sealing contact between the outwardly extending flange of the capsule and the enclosing member of the beverage preparation device, wherein the force F2 is in the range of 500-1500 N when the maximum fluid pressure P2 in the enclosing member of the beverage preparation device outside the capsule is in the range of 6-20 bar.

33. The system according to claim 32, wherein the system is arranged such that, in use, prior to or at the start of brewing, a free end of the enclosing member of the beverage preparation device exerts a force F1 on the sealing member of the capsule to provide a fluid sealing contact between the outwardly extending flange of the capsule and the enclosing member of the beverage preparation device, wherein the force F1 is in the range of 30-150 N when a fluid pressure P1 in the enclosing member of the beverage preparation device outside the capsule is in the range of 0.1-4 bar.

34. The system according to claim 33, wherein the fluid sealing contact provides a seal under such use conditions.

35. The system according to claim 34, wherein the plurality of radially extending open grooves are uniformly spaced relative to each other in tangential direction of the free contact end of the annular element of the beverage preparation device.

36. The system according to claim 35, wherein the greatest width of each groove is 0.9-1.1 mm, wherein a maximal height of each groove in an axial direction of the enclosing member of the beverage preparation device is 0.01-0.09 mm, and wherein the number of grooves is 90 to 110, and wherein the radial width of the free contact end at the location of the grooves is 0.05-0.9 mm.

37. The system according to claim 36, wherein during use when the closing member of the beverage preparation device closes the enclosing member of the beverage preparation device at least the free contact end of the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device, wherein the enclosing member comprises a first part and a second part wherein the second part comprises the free contact end of the enclosing member wherein the second part can move relative to the first part between a first and second position wherein the second part can move from the first position towards the second position in the direction of the closing member under the influence of fluid pressure in the enclosing member wherein the force F1 is reached if the second part is in the first position with the fluid pressure P1 in the enclosing member and wherein the force F2 is reached if the second part is moved towards the second position under the influence of the fluid pressure P2 in the enclosing member.

* * * * *

UNITED STATES PATENT AND TRADEMARK OFFICE
CERTIFICATE OF CORRECTION

PATENT NO. : 11,772,883 B2
APPLICATION NO. : 15/813049
DATED : October 3, 2023
INVENTOR(S) : Hielke Dijkstra et al.

Page 1 of 1

It is certified that error appears in the above-identified patent and that said Letters Patent is hereby corrected as shown below:

On the Title Page

Insert:
--(30) Foreign Application Priority Data May 15, 2015 (NL) ......... PCT/NL2015/050350--

Signed and Sealed this
Thirteenth Day of February, 2024

Katherine Kelly Vidal
*Director of the United States Patent and Trademark Office*